(12) United States Patent
Zhang et al.

(10) Patent No.: US 12,151,318 B2
(45) Date of Patent: Nov. 26, 2024

(54) ADDITIVE REPAIR DEVICE FOR INTERNAL THREADS

(71) Applicant: Nanchang Hangkong University, Nanchang (CN)

(72) Inventors: Timing Zhang, Nanchang (CN); Yuhua Chen, Nanchang (CN); Jilin Xie, Nanchang (CN); Helai Huang, Nanchang (CN); Shanlin Wang, Nanchang (CN); Yongde Huang, Nanchang (CN); Hongwei Luo, Nanchang (CN); Chengbing Zhang, Nanchang (CN); Jinyang Hu, Nanchang (CN)

(73) Assignee: Nanchang Hangkong University, Nanchang (CN)

( * ) Notice: Subject to any disclaimer, the term of this patent is extended or adjusted under 35 U.S.C. 154(b) by 596 days.

(21) Appl. No.: 17/548,578

(22) Filed: Dec. 12, 2021

(65) Prior Publication Data

US 2022/0193806 A1 Jun. 23, 2022

(30) Foreign Application Priority Data

Dec. 23, 2020 (CN) .......................... 202011534821.5

(51) Int. Cl.
*B23K 9/04* (2006.01)

(52) U.S. Cl.
CPC ................... *B23K 9/048* (2013.01)

(58) Field of Classification Search
CPC ....... B23P 6/00; B23K 9/048; B23K 37/0276; B23G 9/009; B33Y 30/00; B23B 2260/044; B23B 31/16
USPC ..................................................... 219/121.63
See application file for complete search history.

(56) References Cited

U.S. PATENT DOCUMENTS

| | | | |
|---|---|---|---|
| 8,319,139 B2 * | 11/2012 | Esslinger | F16M 11/043 219/76.1 |
| 10,254,499 B1 * | 4/2019 | Cohen | B29C 64/321 |
| 2009/0021090 A1 * | 1/2009 | Du | H02K 1/148 310/50 |
| 2011/0024394 A1 * | 2/2011 | Esslinger | F16M 11/24 219/76.1 |
| 2015/0042183 A1 * | 2/2015 | Oktavec | H02K 1/148 310/50 |

* cited by examiner

*Primary Examiner* — Eric S Stapleton
(74) *Attorney, Agent, or Firm* — Fish IP Law, LLP

(57) ABSTRACT

An additive repair device for internal threads is provided. The device includes a moving assembly, a rotating assembly, a speed regulation assembly, a gear assembly, an additive assembly, and a connecting assembly. The moving assembly includes a drive part and a linear movement mechanism. The additive assembly is connected to the linear movement mechanism through the connecting assembly. One end, which is far away from the drive part, of the linear movement mechanism is connected to an input end of the speed regulation assembly through the gear assembly. The rotating assembly includes a clutch mechanism and a clamping mechanism. The clutch mechanism includes a clutch outer gear and a clutch inner gear. The clutch outer gear is arranged at an output end of the speed regulation assembly. The clamping mechanism is fixed to one end, which is far away from the speed regulation assembly, of the clutch inner gear.

8 Claims, 5 Drawing Sheets

ADDITIVE REPAIR DEVICE FOR INTERNAL THREADS

CROSS REFERENCE TO RELATED APPLICATION

This patent application claims the benefit and priority of Chinese Patent Application No. 202011534821.5 filed on Dec. 23, 2020, the disclosure of which is incorporated by reference herein in its entirety as part of the present application.

TECHNICAL FIELD

The present disclosure relates to the field of internal thread repair technologies, and in particular, to an additive repair device for internal threads.

BACKGROUND ART

Many types of equipment and tools in engineering machinery are commonly fixed and connected in a nut-bolt connection mode. Internal threads of nuts will be worn due to long-term use, thereby resulting in thread failure. At this time, the worn nuts will be generally scrapped, which causes great waste of resources. Therefore, how to overcome the above-mentioned defects becomes a problem to be solved urgently by those skilled in the art.

SUMMARY

To solve the above technical problems, the present disclosure provides an additive repair device for internal threads, which is convenient to operate, has a good repair effect, and can realize the remanufacturing of waste products, so as to avoid resource waste.

To achieve the abovementioned objective, the present disclosure provides the following solutions.

The present disclosure provides an additive repair device for internal threads, including a moving assembly, a rotating assembly, a speed regulation assembly, a gear assembly, an additive assembly, and a connecting assembly, where the moving assembly includes a drive part and a linear movement mechanism; the additive assembly is connected to the linear movement mechanism through the connecting assembly; the additive assembly is located on one side of the linear movement mechanism; the drive part is configured for driving the connecting assembly and the additive assembly to perform linear movement; one end, which is away from the drive part, of the linear movement mechanism is connected to an input end of the speed regulation assembly through the gear assembly; the rotating assembly includes a clutch mechanism and a clamping mechanism; the clutch mechanism includes a clutch outer gear and a clutch inner gear; the clutch outer gear is arranged at an output end of the speed regulation assembly; the clutch inner gear is capable of being meshed with the clutch outer gear; the clamping mechanism is fixed to one end, which is away from the speed regulation assembly, of the clutch inner gear; the clamping mechanism is configured for clamping a workpiece to be repaired; and the additive assembly is configured to move into the workpiece to be repaired.

Preferably, the linear movement mechanism includes a driving lead screw, a lead screw nut, a fixed support rod, and two lead screw support seats; two ends of the fixed support rod are respectively fixed to the two lead screw support seats; two ends of the driving lead screw are respectively mounted on the two lead screw support seats; one of the two ends, which extends out of a corresponding one of the two lead screw support seats, of the driving lead screw is connected to the drive part; another one of the two ends, which extends out of another one of the two lead screw support seats, of the driving lead screw is connected to the gear assembly; the lead screw nut is mounted on the driving lead screw; and the connecting assembly is mounted on the lead screw nut and the fixed support rod.

Preferably, the connecting assembly includes a moving block, a upright post, a transverse connecting rod, a sleeve, and a locking bolt; one side of the moving block is mounted on the lead screw nut; another side of the moving block is sleeved on the fixed support rod; the upright post is fixed to an upper part of the moving block; the transverse connecting rod is fixed to a side of the upright post; the sleeve is fixed to one end, which is way from the upright post, of the transverse connecting rod; the locking bolt is mounted on the sleeve; and the additive assembly is mounted to the sleeve.

Preferably, the additive assembly includes a vertical connecting rod, a mounting block, a welding wire lead-in pipe bracket, a welding wire lead-in pipe, and two capstan nuts; the vertical connecting rod is mounted in the sleeve and is capable of being fixed through the locking bolt; the mounting block is fixed to a lower end of the vertical connecting rod; the welding wire lead-in pipe bracket is horizontally sleeved in the mounting block; the welding wire lead-in pipe is fixedly sleeved in the welding wire lead-in pipe bracket; and each of two ends of the welding wire lead-in pipe is provided with a corresponding one of the two capstan nuts.

Preferably, the gear assembly includes a first gear and a second gear; the first gear is fixed to one end, which is away from the drive part, of the driving lead screw; the second gear is arranged at the input end of the speed regulation assembly; and the first gear is meshed with the second gear.

Preferably, the speed regulation assembly includes a continuously variable transmission and hydraulic control valves; a transmission input shaft and a transmission output shaft are arranged on the continuously variable transmission; the hydraulic control valves are configured for regulating a transmission ratio of the transmission input shaft to the transmission output shaft; the second gear is fixed to the transmission input shaft; and the clutch outer gear is fixed to the transmission output shaft.

Preferably, the clamping mechanism includes a three jaw chuck and multiple connecting rods arranged on one side of the three jaw chuck; one end, which is away from the three jaw chuck, of each of the multiple connecting rods is fixed with the clutch inner gear; a regulating hole is formed in the three jaw chuck; and a regulating pin is arranged in the regulating hole.

Preferably, the clutch mechanism further includes a vertical bevel gear and a transverse bevel gear; the vertical bevel gear, the clutch outer gear, and a convex support part are arranged on the transmission output shaft in sequence; a cross section of an upper end of the regulating pin is non-circular; a non-circular through hole is formed in a center of the transverse bevel gear; and the transverse bevel gear is capable of being sleeved on the upper end of the regulating pin through the non-circular hole.

Compared with the prior art, some embodiments achieves the following technical effects.

The additive repair device for the internal threads provided by the present disclosure includes the moving assembly, the rotating assembly, the speed regulation assembly, the gear assembly, the additive assembly, and the connecting assembly. The moving assembly includes the drive part and the linear movement mechanism. One end, which is away from the drive part, of the linear movement mechanism is connected to the input end of the speed regulation assembly through the gear assembly. The rotating assembly includes the clutch mechanism and the clamping mechanism. The clutch mechanism includes the clutch outer gear and the clutch inner gear. The clutch outer gear is arranged at the output end of the speed regulation assembly. The clamping mechanism is fixed to one end, which is away from the speed regulation assembly, of the clutch inner gear, and is used for clamping the workpiece to be repaired. The additive assembly can move into the workpiece to be repaired. During operation, the drive part transmits a driving force to the clutch outer gear through the gear assembly and the speed regulation assembly. When the clutch inner gear fixed to the clamping mechanism is meshed with the clutch outer gear, the driving force is transmitted to the clamping mechanism and can drive the clamping mechanism to drive the workpiece to be repaired to rotate. Meanwhile, the additive assembly can perform linear movement. The surfacing welding of the surface layer of the internal threads can be performed by combining the two movements, i.e., combining the linear movement with the rotation of the workpiece to be repaired so as to realize additive repair of the internal threads. The device is convenient to operate and good in repair effect, and can realize the remanufacturing of the waste products, so as to avoid resource waste. Meanwhile, the speed regulation assembly can realize the regulation of the ratio of the linear movement speed of the additive assembly to the rotation speed of the clamping mechanism, so that the internal threads of nuts with different specifications can be repaired.

BRIEF DESCRIPTION OF THE DRAWINGS

In order to more clearly illustrate technical solutions in the embodiments of the present application or in the prior art, a brief introduction to the accompanying drawings required for the embodiment will be provided below. Obviously, the accompanying drawings in the following description are only some of the embodiments of the present disclosure. Those of ordinary skill in the art would also be able to derive other drawings from these drawings without making creative efforts.

Figure 1:
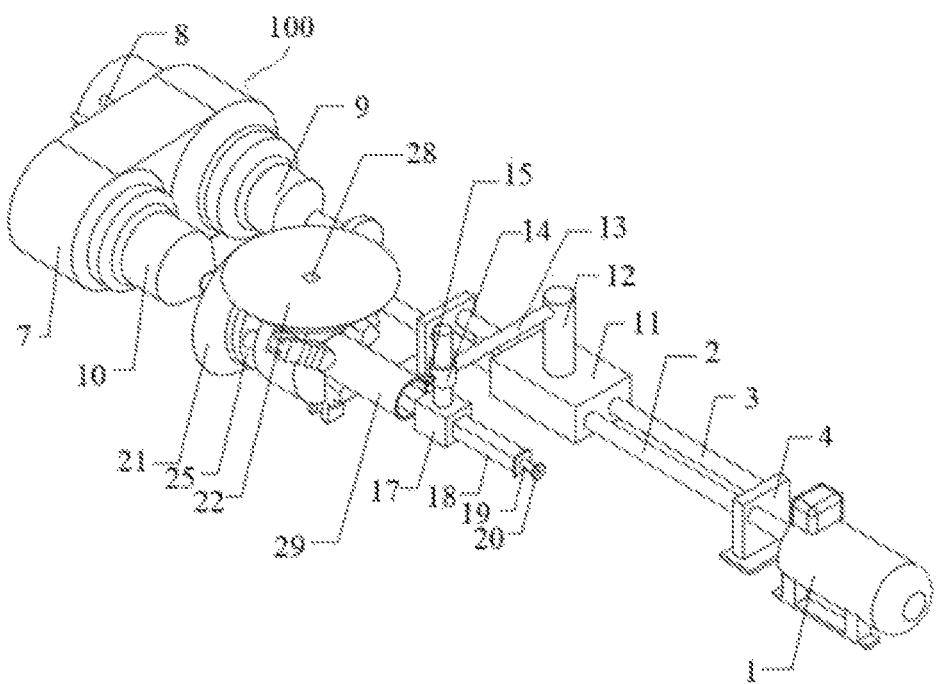
FIG. 1 is a schematic structural diagram of an additive repair device for internal threads provided by the present disclosure.

Reference signs in the drawings: 100 additive repair device for internal threads; 1 drive part, 2 driving lead screw; 3 fixed support rod; 4 lead screw support seat; 5 first gear; 6 second gear; 7 continuously variable transmission; 8 hydraulic control valve; 9 transmission input shaft; 10 transmission output shaft; 11 moving block; 12 upright post; 13 transverse connecting rod; 14 sleeve; 15 locking bolt; 16 vertical connecting rod; 17 mounting block; 18 welding wire lead-in pipe bracket; 19 welding wire lead-in pipe; 20 capstan nut; 21 vertical bevel gear; 22 transverse bevel gear; 23 clutch outer gear; 24 convex support part; 25 clutch inner gear; 26 connecting rod; 27 three jaw chuck; 28 regulating pin; and 29 workpiece to be repaired.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments of the present invention, all other embodiments obtained by those of ordinary skill in the art without creative work shall fall within the protection scope of the present invention.

An objective of some embodiments is to provide an additive repair device for internal threads, which is convenient to operate, has a good repair effect, and can realize the remanufacturing of waste products, so as to avoid resource waste.

In order to make the objectives, features, and advantages mentioned above of the present disclosure more apparent and easily understood, the present disclosure will be further described in detail below with reference to the drawings and particular implementations.

Figure 2:
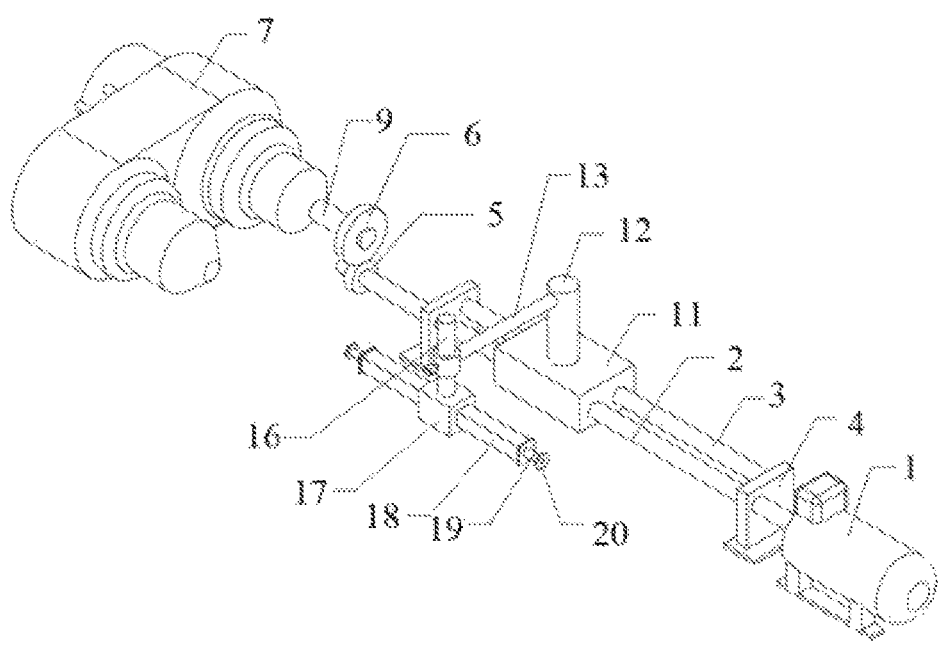
FIG. 2 is a schematic structural diagram of a moving assembly, a speed regulation assembly, and an additive assembly in the additive repair device for the internal threads provided by the present disclosure.
Figure 3:
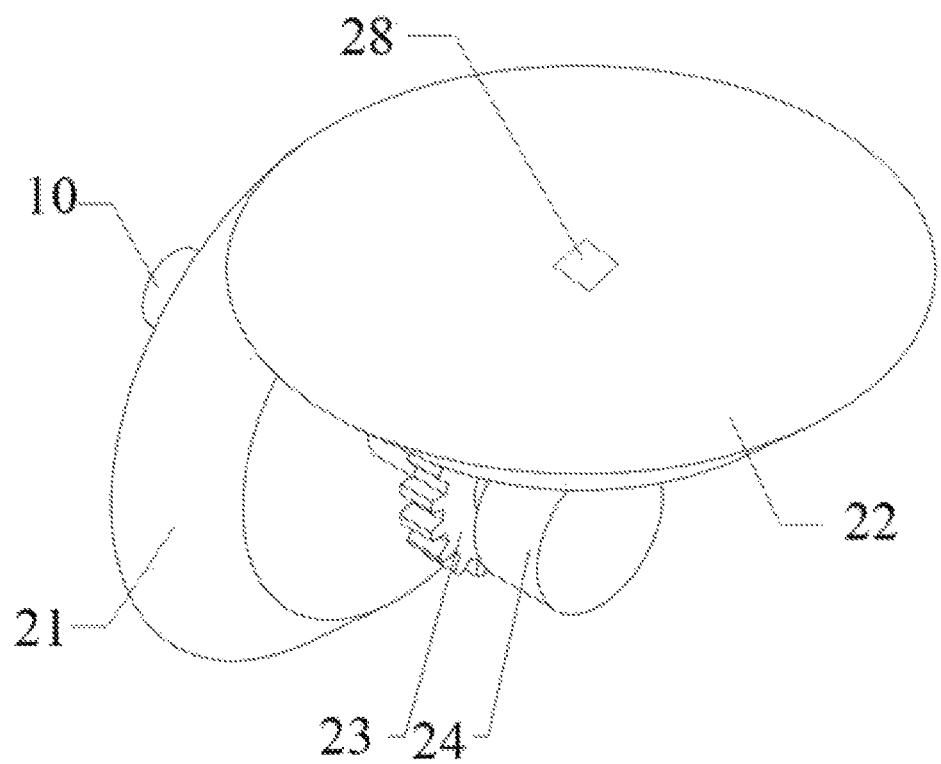
FIG. 3 is a schematic structural diagram of a clutch mechanism in the additive repair device for the internal threads provided by the present disclosure.

As shown in FIG. 1 to FIG. 3, the present embodiment provides an additive repair device 100 for internal threads, including a moving assembly, a rotating assembly, a speed regulation assembly, a gear assembly, an additive assembly, and a connecting assembly. The moving assembly includes a drive part 1 and a linear movement mechanism. The additive assembly is connected to the linear movement mechanism through the connecting assembly. The additive assembly is located on one side of the linear movement mechanism. The drive part 1 is used for driving the connecting assembly and the additive assembly to perform linear movement. One end, which is away from the drive part 1, of the linear movement mechanism is connected to an input end of the speed regulation assembly through the gear assembly. The rotating assembly includes a clutch mechanism and a clamping mechanism. The clutch mechanism includes a clutch outer gear 23 and a clutch inner gear 25. The clutch outer gear 23 is arranged at an output end of the speed regulation assembly. The clutch inner gear 25 is able to be meshed with the clutch outer gear 23. The clamping mechanism is fixed to one end, which is away from the speed regulation assembly, of the clutch inner gear 25. The clamping mechanism is used for clamping a workpiece to be repaired 29. The additive assembly can move into the workpiece to be repaired 29. The workpiece to be repaired 29 in the present embodiment is a copper nut.

During operation, the drive part 1 transmits a driving force to the clutch outer gear 23 through the linear movement mechanism, the gear assembly, and the speed regulation assembly. When the clutch inner gear 25 fixed to the clamping mechanism is meshed with the clutch outer gear 23, the driving force is transmitted to the clamping mechanism and can drive the clamping mechanism to drive the workpiece to be repaired 29 to rotate. Meanwhile, the additive assembly can perform linear movement. The surfacing welding of the surface layer of the internal threads can be performed by combining the two movements, i.e, combining the linear movement with the rotation of the workpiece to be repaired 29, so as to realize additive repair of the internal threads. The device is convenient to operate, has a good repair effect, and can realize the remanufacturing of waste products, so as to avoid resource waste caused by directly scraping the nuts. After the surface layer of the internal threads of the nut is worn, the internal threads of the worn nut can be restored to an initial state by performing the surfacing welding of the a layer of threads in the surface of the internal threads, and can be repaired and restored more accurately according to the present embodiment. Meanwhile, the speed regulation assembly can realize the regulation of the ratio of the linear movement speed of the additive assembly to the rotation speed of the clamping mechanism, so that the internal threads of nuts with different specifications can be repaired.

As shown in FIG. 2, the linear movement mechanism includes a driving lead screw 2, a lead screw nut, a fixed support rod 3, and two lead screw support seats 4. Two ends of the fixed support rod 3 are respectively fixed to the two lead screw support seats 4. Two ends of the driving lead screw 2 are respectively mounted on the two lead screw support seats 4. One of the two ends, which extends out of a corresponding one of the two lead screw seats, of the driving lead screw 2 is connected to the drive part 1. Another one of the two ends, which extends out of another one of the two lead screw support seats, of the driving lead screw 2 is connected to the gear assembly. The lead screw nut is mounted on the driving lead screw 2. The connecting assembly is mounted on the lead screw nut and the fixed support rod 3. The connecting assembly is supported and guided by the fixed support rod 3, so that the connecting assembly moves more stably. Specifically, the drive part 1 is a speed regulating motor.

The connecting assembly includes a moving block 11, an upright post 12, a transverse connecting rod 13, a sleeve 14, and a locking bolt 15. One side of the moving block 11 is mounted on the lead screw nut. The other side of the moving block 11 is sleeved on the fixed support rod 3. The upright post 12 is fixed to the upper part of the moving block 11. The transverse connecting rod 13 is fixed to a side of the upright post 12. A sleeve 14 is fixed to one end, which is away from the upright post 12, of the transverse connecting rod 13. The locking bolt 15 is mounted on the sleeve 14. The additive assembly is mounted to the sleeve 14. The drive part 1 drives the driving lead screw 2 to rotate during operation, so as to drive the moving block 11 to move in the horizontal direction, and drive the additive assembly fixedly connected to the moving block 11 to perform linear movement.

The additive assembly includes a vertical connecting rod 16, a mounting block 17, a welding wire lead-in pipe bracket 18, a welding wire lead-in pipe 19, and two capstan nuts 20. The vertical connecting rod 16 is mounted in the sleeve 14 and can be fixed through the locking bolt 15. The mounting block 17 is fixed to the lower end of the vertical connecting rod 16. The welding wire lead-in pipe bracket 18 is horizontally sleeved in the mounting block 17. The welding wire lead-in pipe 19 is fixedly sleeved in the welding wire lead-in pipe bracket 18. Each of the two ends of the welding wire lead-in pipe 19 is provided with one capstan nut 20. A welding wire enters the welding wire lead-in pipe 19 from the capstan nut 20, and extends out from the capstan nut 20 at the other end to perform surfacing welding operation. The surfacing welding operation is performed with the cooperation of an existing welding machine. The vertical connecting rod 16 is configured to move in the vertical direction in the sleeve 14, so that the height of the additive assembly can be regulated. Thus, the device is more flexible, and the regulation of the position of the welding wire lead-in pipe 19 in the vertical direction is facilitated according to actual requirements.

The gear assembly includes a first gear 5 and a second gear 6. The first gear 5 is fixed to one end, which is away from the drive part 1, of the driving lead screw 2. The second gear 6 is arranged at an input end of the speed regulation assembly. The first gear 5 is meshed with the second gear 6, so as to transmit the driving force of the drive part 1 to the speed regulation assembly.

The speed regulation assembly includes a continuously variable transmission 7 and hydraulic control valves 8. A transmission input shaft 9 and a transmission output shaft 10 are arranged on the continuously variable transmission 7. The hydraulic control valves 8 are used for regulating a transmission ratio of the transmission input shaft 9 to the transmission output shaft 10, the second gear 6 is fixed to the transmission input shaft 9, and the clutch outer gear 23 is fixed to the transmission output shaft 10, so as to regulate the ratio of the linear movement speed of the additive assembly to the rotation speed of the clamping mechanism. In the embodiment, the continuously variable transmission 7 is a Continuously Variable Transmission (CVT).

The clamping mechanism includes a three jaw chuck 27 and multiple connecting rods 26 arranged on one side of the three jaw chuck 27. One end, which is away from the three jaw chuck 27, of each of the multiple connecting rods 26 is fixed with the clutch inner gear 25. A regulating hole is formed in the three jaw chuck 27, and a regulating pin 28 is arranged in the regulating hole. The movement of movable clamping jaws of the three jaw chuck 27 can be realized by rotating the regulating pin 28, so as to realize the clamping or unscrewing of the workpiece 29 to be repaired.

As shown in FIG. 3, the clutch mechanism further includes a vertical bevel gear 21 and a transverse bevel gear 22. The vertical bevel gear 21, the clutch outer gear 23, and a convex support part 24 are arranged on the transmission output shaft 10 in sequence. The three jaw chuck 27 is sleeved on the convex support part 24. The convex support part 24 supports the three jaw chuck 27. The three jaw chuck 27 can move reciprocally along the axial direction of the transmission output shaft 10. The cross section of the upper end of the regulating pin 28 is non-circular. A non-circular through hole is formed in the center of the transverse bevel gear 22. The transverse bevel gear 22 is able to be sleeved on the upper end of the regulating pin 28 through the non-circular hole. The regulating pin 28 will be driven to rotate when the transverse bevel gear 22 rotates.

Figure 4:
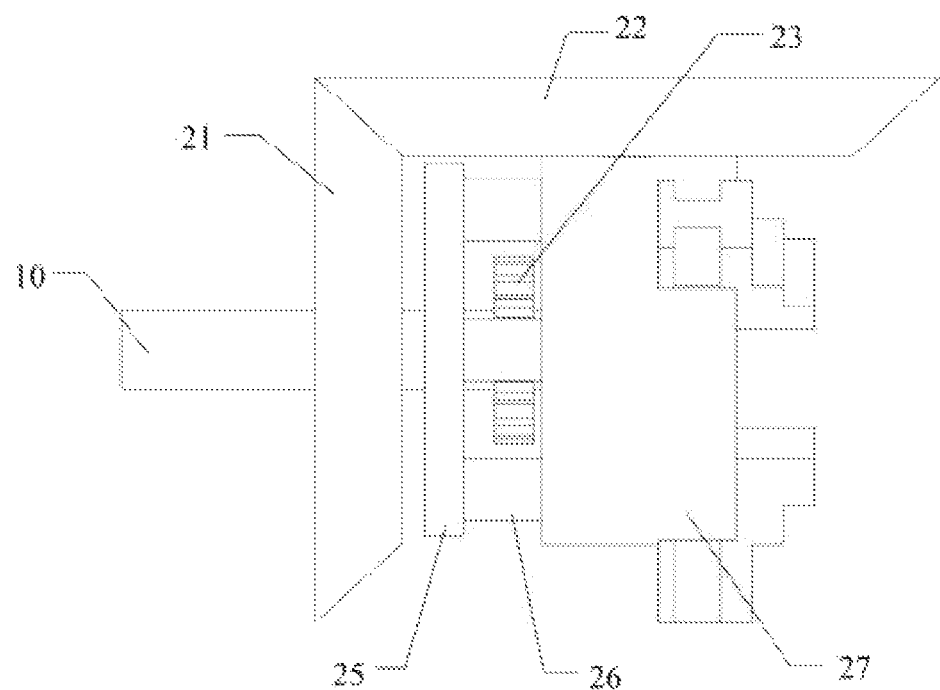
FIG. 4 is a schematic structural diagram of a vertical bevel gear meshing with a transverse bevel gear in the additive repair device for the internal threads provided by the present disclosure.
Figure 5:
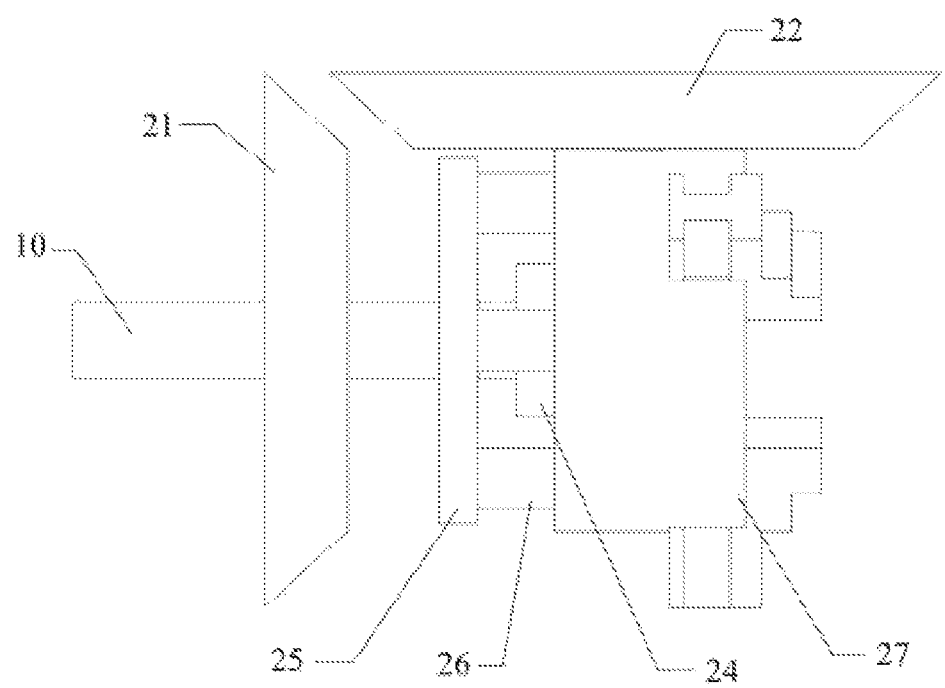
FIG. 5 is a schematic diagram of a clutch inner gear meshing with a clutch outer gear in the additive repair device for the internal threads provided by the present disclosure.

As shown in FIG. 4, when the clutch inner gear 25 is located between the vertical bevel gear 21 and the clutch outer gear 23, the transverse bevel gear 22 is meshed with the vertical bevel gear 21. At this time, the vertical bevel gear 21 moves and drives the transverse bevel gear 22 and the regulating pin 28 to rotate, so that the clamping force of the three jaw chuck 27 on the workpiece to be repaired 29 can be regulated. The three jaw chuck 27 is moved forward to be in a state illustrated in FIG. 5, i.e., the clutch inner gear 25 is meshed with the clutch outer gear 23, the clutch outer gear 22 is separated from the vertical bevel gear 21, and the clutch outer gear 22 and the regulating pin 28 are taken down. When the vertical bevel gear 21 moves, the three jaw chuck 27 can be driven to rotate through the clutch outer gear 23 and the clutch inner gear 25, so as to perform additive repair operation.

Specific embodiments are used in this specification for illustration of the principles and implementations of the present disclosure. The description of the above embodiments is merely used to help understand the method and core concept of the present disclosure. In addition, those of ordinary skill in the art may make modifications to the specific implementations and application scope in accordance with the concept of the present disclosure. In conclusion, the content of this specification should not be construed as a limitation to the present disclosure.

What is claimed is:

1. An additive repair device for internal threads, the device comprising a moving assembly, a rotating assembly, a speed regulation assembly, a gear assembly, an additive assembly, and a connecting assembly, wherein the moving assembly comprises a drive part and a linear movement mechanism; the additive assembly is connected to the linear movement mechanism through the connecting assembly; the additive assembly is located on one side of the linear movement mechanism; the drive part is configured for driving the connecting assembly and the additive assembly to perform linear movement; one end, which is away from the drive part, of the linear movement mechanism is connected to an input end of the speed regulation assembly through the gear assembly; the rotating assembly comprises a clutch mechanism and a clamping mechanism; the clutch mechanism comprises a clutch outer gear and a clutch inner gear; the clutch outer gear is arranged at an output end of the speed regulation assembly; the clutch inner gear is capable of being meshed with the clutch outer gear; the clamping mechanism is fixed to one end, which is away from the speed regulation assembly, of the clutch inner gear; the clamping mechanism is configured for clamping a workpiece to be repaired; and the additive assembly is configured to move into the workpiece to be repaired.

2. The additive repair device for the internal threads according to claim 1, wherein the linear movement mechanism comprises a driving lead screw, a lead screw nut, a fixed support rod, and two lead screw support seats; two ends of the fixed support rod are respectively fixed to the two lead screw support seats; two ends of the driving lead screw are respectively mounted on the two lead screw support seats; one of the two ends, which extends out of a corresponding one of the two lead screw support seats, of the driving lead screw is connected to the drive part; another one of the two ends, which extends out of another one of the two lead screw support seats, of the driving lead screw is connected to the gear assembly; the lead screw nut is mounted on the driving lead screw; and the connecting assembly is mounted on the lead screw nut and the fixed support rod.

3. The additive repair device for the internal threads according to claim 2, wherein the connecting assembly comprises a moving block, a upright post, a transverse connecting rod, a sleeve, and a locking bolt; one side of the moving block is mounted on the lead screw nut; another side of the moving block is sleeved on the fixed support rod; the upright post is fixed to an upper part of the moving block; the transverse connecting rod is fixed to a side of the upright post; the sleeve is fixed to one end, which is way from the upright post, of the transverse connecting rod; the locking bolt is mounted on the sleeve; and the additive assembly is mounted to the sleeve.

4. The additive repair device for internal threads according to claim 3, wherein the additive assembly comprises a vertical connecting rod, a mounting block, a welding wire lead-in pipe bracket, a welding wire lead-in pipe, and two capstan nuts; the vertical connecting rod is mounted in the sleeve and is capable of being fixed through the locking bolt; the mounting block is fixed to a lower end of the vertical connecting rod; the welding wire lead-in pipe bracket is horizontally sleeved in the mounting block; the welding wire lead-in pipe is fixedly sleeved in the welding wire lead-in pipe bracket; and each of two ends of the welding wire lead-in pipe is provided with a corresponding one of the two capstan nuts.

5. The additive repair device for internal threads according to claim 2, wherein the gear assembly comprises a first gear and a second gear; the first gear is fixed to one end, which is away from the drive part, of the driving lead screw; the second gear is arranged at the input end of the speed regulation assembly; and the first gear is meshed with the second gear.

6. The additive repair device for internal threads according to claim 5, wherein the speed regulation assembly comprises a continuously variable transmission and hydraulic control valves; a transmission input shaft and a transmission output shaft are arranged on the continuously variable transmission; the hydraulic control valves are configured for regulating a transmission ratio of the transmission input shaft to the transmission output shaft; the second gear is fixed to the transmission input shaft; and the clutch outer gear is fixed to the transmission output shaft.

7. The additive repair device for internal threads according to claim 6, wherein the clamping mechanism comprises a three jaw chuck and a plurality of connecting rods arranged on one side of the three jaw chuck; one end, which is away from the three jaw chuck, of each of the plurality of connecting rods is fixed with the clutch inner gear; a regulating hole is formed in the three jaw chuck; and a regulating pin is arranged in the regulating hole.

8. The additive repair device for internal threads according to claim 7, wherein the clutch mechanism further comprises a vertical bevel gear and a transverse bevel gear; the vertical bevel gear, the clutch outer gear, and a convex support part are arranged on the transmission output shaft in sequence; a cross section of an upper end of the regulating pin is non-circular; a non-circular through hole is formed in a center of the transverse bevel gear; and the transverse bevel gear is capable of being sleeved on the upper end of the regulating pin through the non-circular hole.

* * * * *